Feb. 19, 1952  A. P. HELDENBRAND  2,586,226
WATER FILTER
Filed Oct. 7, 1948
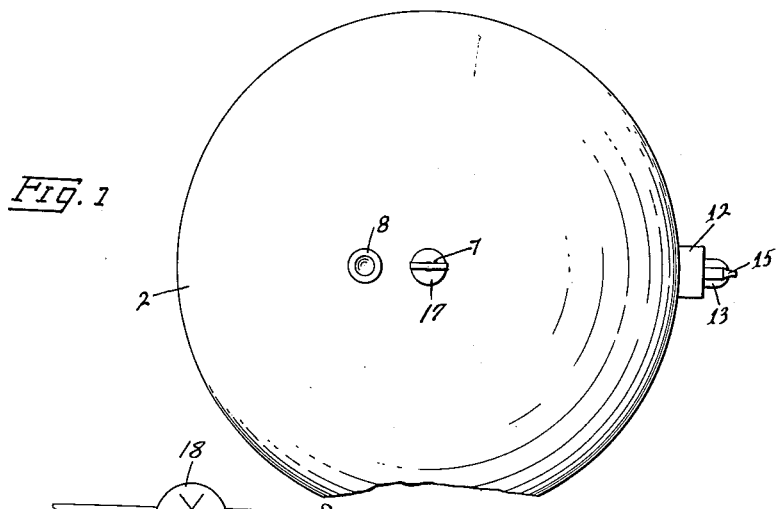
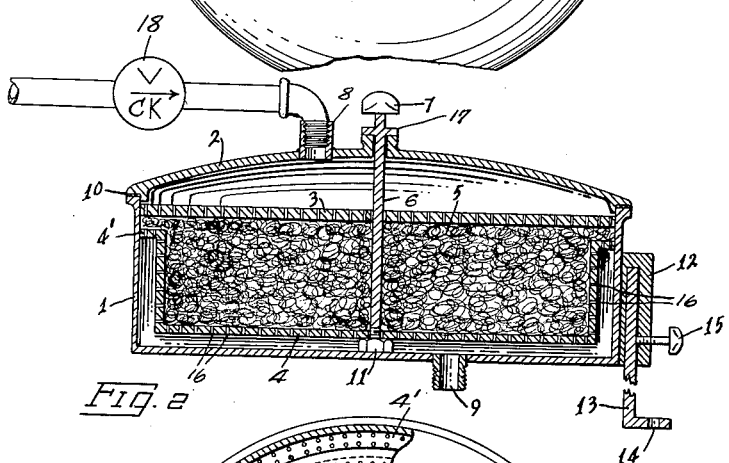
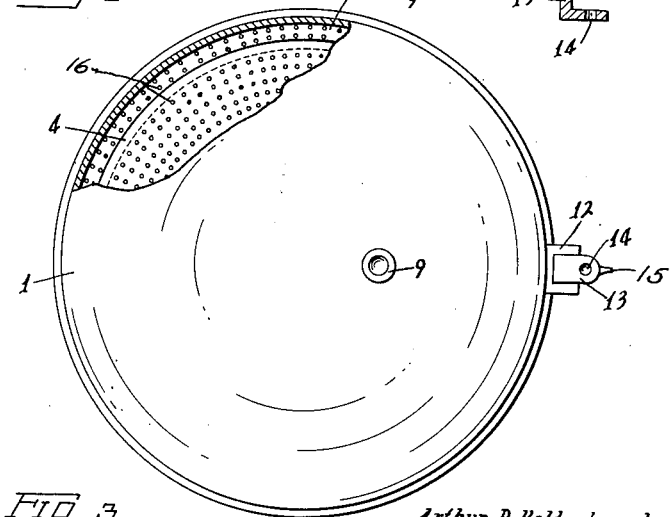
Arthur P. Heldenbrand, INVENTOR.
BY
*Ca Snow Co.*
ATTORNEYS.

Patented Feb. 19, 1952

2,586,226

UNITED STATES PATENT OFFICE 2,586,226

WATER FILTER

Arthur P. Heldenbrand, Oklahoma City, Okla.

Application October 7, 1948, Serial No. 53,270

1 Claim. (Cl. 210—131)

This invention relates to a water filter designed for use in connection with internal combustion engines, the primary object of the invention being to provide means for filtering oil, sludge, and other foreign matter from the engine block, thereby freeing the engine cooling water of foreign matter which usually clogs the tubes of the radiator to prevent circulation of water, to accomplish its purpose.

An important object of the invention is to provide a filter of this character which may be readily and easily mounted adjacent to the motor block and connected in the water circulating system.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a plan view of a filter constructed in accordance with the invention.

Fig. 2 is a transverse sectional view through the filter.

Fig. 3 is a bottom plan view of the filter, a portion thereof being broken away, illustrating the cartridge case of the filter.

Referring to the drawing in detail, the body portion of the filter is indicated generally by the reference character 1 and is provided with a removable cover 2, which is slightly bulged to provide a compartment with the filter plate 3 which is disc-like in formation and provided with a plurality of rows of openings through which water passes from the compartment between the cover and filter plate.

Arranged within the body portion is the cartridge case 4, which is provided with an outwardly extended annular flange 4' that contacts with the inner surface of the body portion 1, the cartridge case being of a diameter less than the inner diameter of the body portion 1, to provide a circulating chamber between the body portion and cartridge case. This cartridge case is also provided with a plurality of openings 16 through which the water passes on leaving the cartridge case.

The cartridge includes a filtering element 5 which may be of any desired construction and comprises non-corrosive chemical resisting material capable of being packed in the cartridge case 4 in such a way that water may pass therethrough. Due to the construction of the annular flange 4', and the filter plate, a portion of the material forming the cartridge is clamped between the filter plate 3 and flange, holding the filtering element of the cartridge in place at all times.

Mounted in the bottom of the body portion and disposed centrally thereof is the nut 11 into which one end of the rod 6 is positioned, the rod 6 having a flange 17 formed near the upper end thereof to engage the removable cover 2 and draw the cover 2 into close engagement with the upper edge of the body portion 1. On the upper end of the rod 6 is the finger piece 7 which affords means whereby the rod 6 may be rotated. When the cover is secured, pressure is directed to the filter plate 3 forcing it into clamping engagement with the cartridge.

An opening is formed in the cover 2 in which the pipe 8 extends, the pipe 8 having internal threads to be engaged by a threaded coupling of a hose forming a part of the circulating or cooling system of the motor.

A pipe 9 which is the outlet pipe for the filter, is also threaded to receive the threaded end of a pipe of the system with which the device is used, the pipe 9 providing the return pipe for the water after it has passed through the filter and been freed of its foreign matter. In order that a fluid-tight connection will be provided between the cover 2 and body portion 1, the gasket 10 is provided therebetween.

Secured to the outer surface of the body portion 1 is the socket member 12 into which the bracket 13 extends, the bracket 13 having a right-angled lower end provided with an opening 14 through which a suitable securing bolt or screw is passed in securing the bracket 13 to a supporting surface on the motor block.

A set screw 15 extends through a threaded opening in the socket member 12, and grips the bracket 13, securing the filter to the bracket.

The reference character 18 indicates a check valve installed in the circulating system with which the filter is used, the check valve being disposed between the filter and radiator of the system. The check valve operates to check the back flow of the cooling fluid, enabling the fluid to travel on through the filter.

From the foregoing it will be seen that due to the construction shown and described, I have provided a water filtering device designed for filtering water of the cooling system of an internal combustion engine, to the end that all foreign matter will be removed from the cooling system eliminating any possibility of foreign matter being carried into the fine tubes of the radiator of the cooling system to defeat the purpose of the cooling system.

Having thus described the invention, what is claimed is:

A filter of the class described comprising a body portion having a discharge opening, a cup-shaped perforated cartridge case mounted within the body portion, an annular outwardly disposed flange formed at the upper end thereof, engaging the wall of the body portion holding the cartridge case in spaced relation with the body portion providing an annular passage around the cartridge case, a filtering element contained in the cartridge case, portions of the filtering element resting on the flange, a filtering plate providing a cover for the cartridge case clamping the filtering element against the flange, securing the filtering element within the cartridge case, said filtering plate being perforated, whereby water passes through the filtering plate to the cartridge case, a bulged cover having an outlet pipe whereby water enters the body portion, closing the body portion and holding the filtering plate in position, said bulged cover providing a water receiving compartment with the filter plate, a connecting rod extending exteriorly through the cartridge case, filtering element, filter plate and cover, securing them together, and a nut on the lower end of the rod resting on the bottom of the body portion on which the cartridge case is supported in spaced relation with the body portion, said body portion having an inlet opening in the cover thereof.

ARTHUR P. HELDENBRAND.

REFERENCES CITED

The following references are of record in the file of this patent:

UNITED STATES PATENTS

| Number | Name | Date |
| --- | --- | --- |
| 244,471 | Moore | July 19, 1881 |
| 773,946 | Langhill | Nov. 1, 1904 |
| 1,162,455 | Collins | Nov. 30, 1915 |
| 1,422,190 | Elrod | July 11, 1922 |
| 1,564,666 | Griffin | Dec. 8, 1925 |
| 2,093,549 | Compton | Sept. 21, 1937 |
| 2,274,113 | White | Feb. 24, 1942 |
| 2,280,480 | Cox | Apr. 21, 1942 |
| 2,354,051 | Pawelsky | July 18, 1944 |